UNITED STATES PATENT OFFICE.

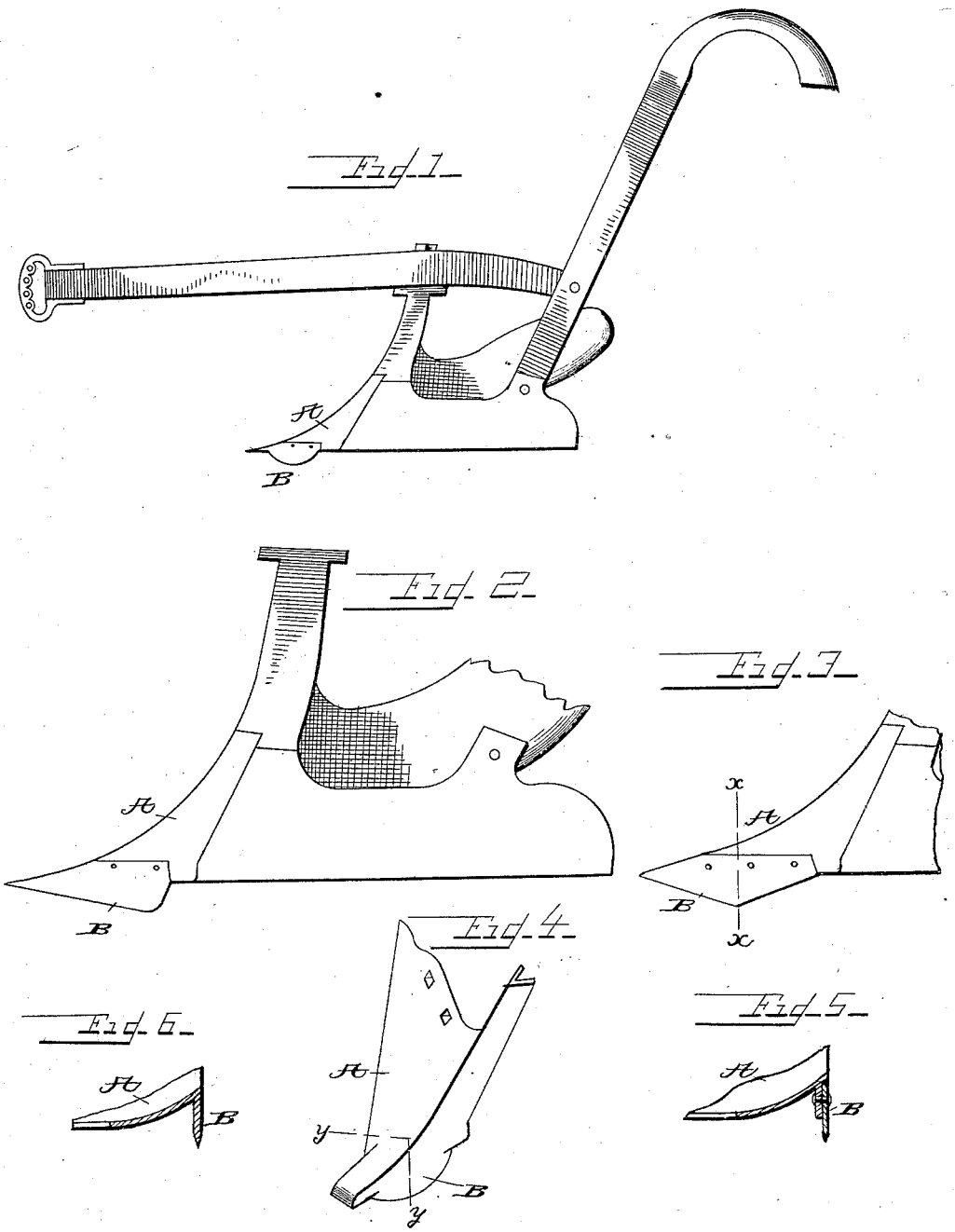

JACOB BRINKERHOFF, OF AUBURN, NEW YORK.

PLOW.

SPECIFICATION forming part of Letters Patent No. 416,988, dated December 17, 1889.

Application filed October 4, 1889. Serial No. 325,999. (No model.)

*To all whom it may concern:*

Be it known that I, JACOB BRINKERHOFF, a citizen of the United States, residing at Auburn, in the county of Cayuga and State of New York, have invented certain new and useful Improvements in Plows; and I do hereby declare the following to be a full, clear, and exact description of the invention, such as will enable others skilled in the art to which it appertains to make and use the same.

My invention relates to plows; and it consists in an improvement in the construction of the same, which is illustrated in the accompanying drawings and fully described in the following specification and claims.

In the drawings, Figure 1 represents a plow with my improvement embodied therein. Fig. 2 is an enlarged view showing a slight modification of my invention, and Fig. 3 is a partial view showing another form of construction. Fig. 4 is a perspective of a point with my improvement applied thereto. Fig. 5 is a section on line $x$ $x$, Fig. 3. Fig. 6 is a section on line $y$ $y$ Fig. 4.

In the practical use of plows as heretofore constructed much inconvenience is experienced from the fact that the point of the plowshare is constantly liable to dodge or swerve from the line of draft toward the outside of the furrow, and then upward and out of the ground. This is especially the case when the ground becomes dry and hard and the point of the plowshare somewhat worn. This difficulty causes the furrows to be made of uneven depth and width. The labor of the operator is much increased by it, for, in addition to his exertions in trying to keep the plow in the line of draft and in the ground to the proper depth, he has often to draw the plow backward several feet and start it in the ground again. Sometimes the plowing has to be suspended when the ground has become dry and hard, because the plow cannot be kept in the ground. The draft of a plow is downward as well as forward, and if the point of the plowshare can be kept in the line of draft the plow can always be kept in the ground and at the proper depth. The object of my invention is to keep the point of the plowshare in the line of draft, and thus obviate the difficulties mentioned; and to this end I provide the point with what I term a "guide," which is composed of a single downwardly-extending rigid wall adapted to readily enter the ground at the bottom of the furrow and traverse it longitudinally. This wall I term a "guide," because its function is to guide or keep the point of the plowshare in the line of draft.

In the drawings, A represents an ordinary plow-point which is provided with this guide B. This guide extends from a point at or near the forward extremity of the plow-point rearwardly any desired distance, preferably three or four inches. It may also be of any desired depth, as found most efficient or desirable, usually about one inch, tapering to a less depth near the forward end, so as to enable it to readily slide over stones and other obstructions in the ground. Its lower edge is so fashioned as to have somewhat the appearance of the earth-cutting edge of an ordinary colter. This guide moving longitudinally to its full depth in the compact ground at the bottom of the furrow will keep the point in the line of draft, and thus guide the whole plow in its movement through the soil, for if the point of the plow is kept in the line of draft the body of the plow must follow and keep its proper course. The guide B may be cast from the same metal as the plow-point and integral therewith, or it may be formed separately and attached thereto by any proper means and in any proper manner, so as to form a rigid guide.

In Figs. 1, 2, and 3 I have shown the guide B having its greatest depth adjacent to the center of its length, and in these instances the guide B is formed separate from the plow-point and secured thereto by suitable bolts or rivets. If desired, the plow-point may be provided with a suitable recess or seat to receive the guide, it being secured therein by any suitable means—for instance, bolts or rivets, as shown in Figs. 1, 2, 3, and 5. In all of these constructions the guide B may be removed when desired and a new one inserted and secured in its place.

The space under the point of the plowshare not occupied by the guide B should not be occupied by other walls or projections in such manner as to engage and retain stones or other bodies between them and the guide B, because, in order to properly perform its functions, the guide B must be left free to scour and enter the ground its full depth; but in any event the guide B should have its main portion extending below the bottom or sole of the plowshare or plow-point or any other projections from or parts of the same, so that fast stones will not wedge in between such parts and the guide B and break one or both of them. Again, the construction with other downward projections is very objectionable, as the channel thus formed will frequently become packed with earth and stones, and not only prevent the guide B and adjacent parts from scouring, but prevent the guide B from entering the ground far enough to be of any practical use; but with the adjacent space unobstructed the guide B will at all times perform its functions to the best advantage and slide by and pass stones without injury.

It will be readily seen that with the guide B moving at its full depth, through the compact ground at the bottom of the furrow the point of the plowshare will be kept in the line of draft and the difficulties mentioned obviated, and the plow-point can be used much longer than heretofore before it has to be removed and replaced by a new one. The guide is substantially at right angles to the plane of the bottom of the point, and one of these devices may extend forward farther than the other, as most clearly seen in Fig. 4. When the cutting-edge of one of these parts extends forward in advance of the other, the cut of both is easier, the scouring of the parts is more effective, and there is less danger of earth packing in the angle between the vertical and horizontal walls of the two parts.

It is well known that furrows cut by a plow are not of uniform depth in all places, and especially when a wheel is not used, and when a plow is cutting a furrow a little deeper than the next preceding one the soil next to the bottom of the preceding furrow is imperfectly turned over because the soil of the two furrows is not cut apart at the bottom. In all such cases the guide B performs another useful function, if located as herein described, because its deep vertical cut serves to facilitate the turning over of the next furrow even if the plow in making such succeeding furrow should make a greater depth, and thus the work of the plow will be rendered more thorough and uniform.

It will be understood that the exact details of construction may be varied to a considerable extent without departing from the spirit of my invention.

I am aware that a guide has been provided under the center of a shovel-plow, and that potato-digging machines have been provided with shoes riding on the ground for steadying the machines; also, that the point of a turn or mold-board plow has been provided with a pair of strengthening-ribs. I make no claim to such constructions; but

What I claim, and desire to secure by Letters Patent, is—

1. A plow-point provided with one downwardly-extending rigid wall whose lowest earth-engaging portion lies below the horizontal plane of all earth-engaging parts between it and the edge of the plow-point opposite to it for the purpose of guiding the plow, substantially as described.

2. A plow-point provided with one rigid wall which extends downwardly below the bottom or sole of the plow for the purpose of guiding the same, substantially as described.

3. A plow-point provided with one downwardly-extending rigid wall whose greater portion in a vertical direction lies below the horizontal plane of all earth-engaging parts between it and the edge of the plow-point opposite to it for the purpose of guiding the plow, substantially as described.

4. A plow-point having on its under side a substantially-horizontal and a substantially-vertical rigid wall, one of said walls extending forward of the other, the vertical wall extending downwardly below the bottom or sole of the point forming a guide for keeping the plow in the line of draft, substantially as described.

5. A plow-point provided with a downwardly-extending rigid wall for guiding the plow, said wall being located beneath the landside edge of the plow-point and having its lowest earth-engaging portion lying below the horizontal plane of all earth-engaging parts between it and the opposite edge of the plow-point, substantially as described.

6. A plow-point provided with a recess or seat and a guide secured therein and extending below the bottom or sole of the point for guiding the plow, substantially as described.

In testimony whereof I affix my signature in presence of two witnesses.

JACOB BRINKERHOFF.

Witnesses:
JAS. T. CARSON,
ARTHUR G. GILBERT.